Dec. 17, 1963 T. E. GANNOE 3,114,828

MANUFACTURE OF ELECTRICAL CONTACTS

Filed Dec. 14, 1960 12 Sheets-Sheet 1

INVENTOR
Thomas E. Gannoe
BY
Michael Hertz
ATTORNEY

Dec. 17, 1963 T. E. GANNOE 3,114,828

MANUFACTURE OF ELECTRICAL CONTACTS

Filed Dec. 14, 1960 12 Sheets-Sheet 2

Dec. 17, 1963 T. E. GANNOE 3,114,828

MANUFACTURE OF ELECTRICAL CONTACTS

Filed Dec. 14, 1960 12 Sheets-Sheet 3

INVENTOR
Thomas E. Gannoe
BY
Michael Hertz
ATTORNEY

Dec. 17, 1963 T. E. GANNOE 3,114,828

MANUFACTURE OF ELECTRICAL CONTACTS

Filed Dec. 14, 1960 12 Sheets-Sheet 4

INVENTOR
Thomas E. Gannoe
BY
Michael Hertz
ATTORNEY

MANUFACTURE OF ELECTRICAL CONTACTS

Filed Dec. 14, 1960 12 Sheets-Sheet 5

INVENTOR
Thomas E. Gannoe
BY
Michael Hertz
ATTORNEY

Dec. 17, 1963 T. E. GANNOE 3,114,828

MANUFACTURE OF ELECTRICAL CONTACTS

Filed Dec. 14, 1960

12 Sheets-Sheet 6

INVENTOR
Thomas E. Gannoe
BY
Michael Hertz
ATTORNEY

INVENTOR
Thomas E. Gannoe
BY
Michael Hertz
ATTORNEY

INVENTOR
Thomas E. Gannoe
BY
Michael Hertz
ATTORNEY

INVENTOR
Thomas E. Gannoe
BY
Michael Hertz
ATTORNEY

INVENTOR
Thomas E. Gannoe
BY
Michael Hertz
ATTORNEY

INVENTOR
Thomas E. Gannoe
BY
Michael Hertz
ATTORNEY

MANUFACTURE OF ELECTRICAL CONTACTS

Filed Dec. 14, 1960 12 Sheets-Sheet 12

INVENTOR
Thomas E. Gannoe
BY
Michael Hertz
ATTORNEY

United States Patent Office 3,114,828
Patented Dec. 17, 1963

3,114,828
MANUFACTURE OF ELECTRICAL CONTACTS

Thomas E. Gannoe, Warren, Pa., assignor to Sylvania Electric Products Inc., a corporation of Delaware Filed Dec. 14, 1960, Ser. No. 75,870
14 Claims. (Cl. 219—103)

This invention relates to the method and apparatus for manufacturing contact springs. In particular, it relates to a method and apparatus wherein the tip of a wire of contact material such as a gold alloy is applied to a strip stock of spring material and welded thereto, the wire being subsequently parted from the welded-on piece of wire and the spring material subsequently cut and shaped to form a spring contact.

In the prior art, where a continuous process of welding contacts to spring material was employed, the contacts were welded to individual contact springs rather than to a strip of spring contact material. This entailed individual handling of the contact springs and increased cost of production.

It is an object of this invention to provide a machine which will manufacture spring contacts out of spring strip stock or like materials and from a continuous strip of contact material such as wire.

A further object of the invention is to manufaceure these spring contacts at a rapid rate.

A still further object of the invention is to provide means and mechanism for manufacturing spring contacts whereby there is assured positive adherence of the contact material to the springs.

Yet another object of the invention is to provide a machine for making spring contacts which are of uniform character as to length of springs and spacing of contact from the end of the spring.

These and other objects will become apparent after consideration of the following specification, when taken in conjunction with the accompanying drawings, in which.

Figure 1:
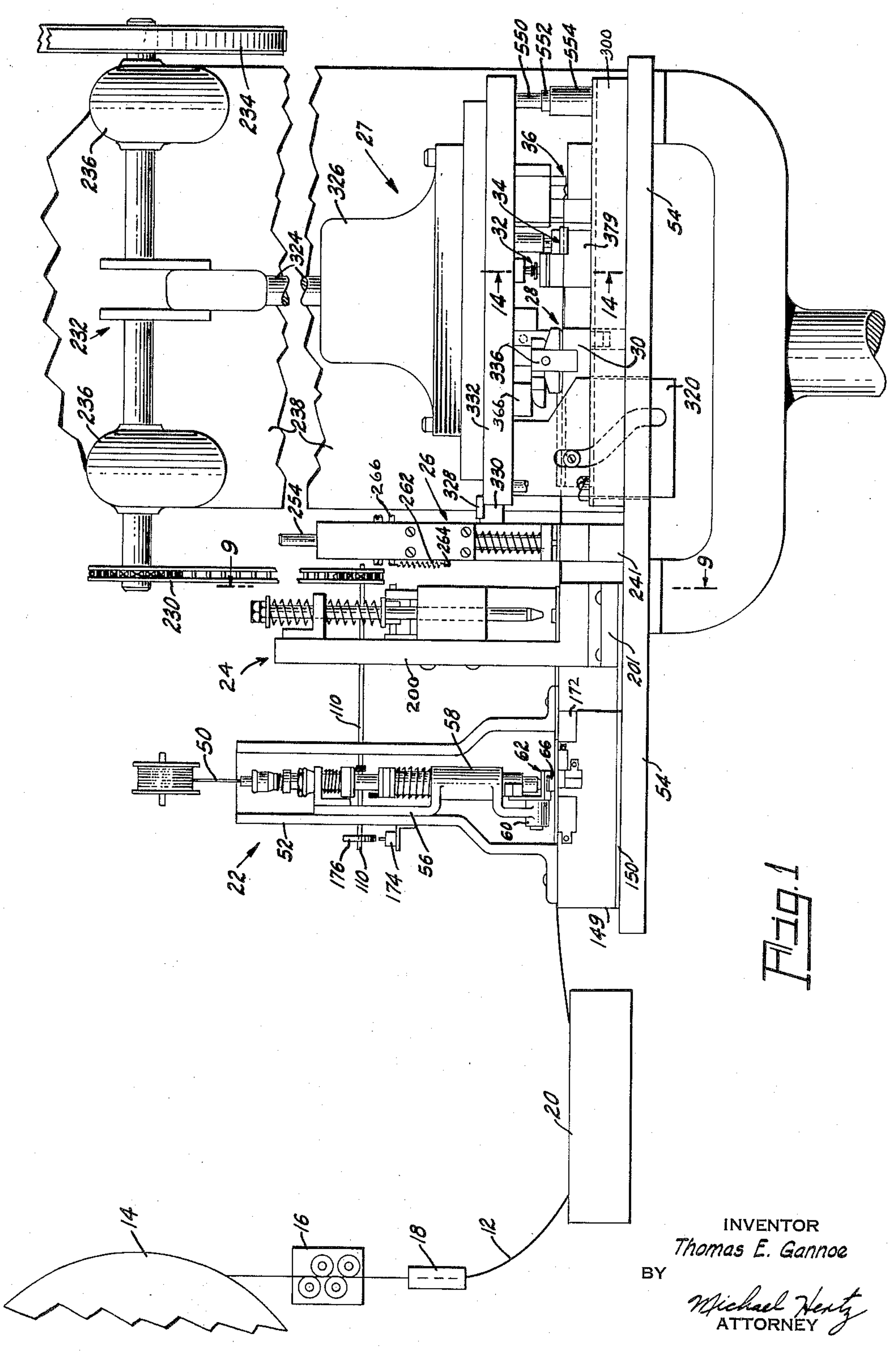
FIG. 1 is a front elevation of the machine, parts being broken away to conserve space.
Figure 22:
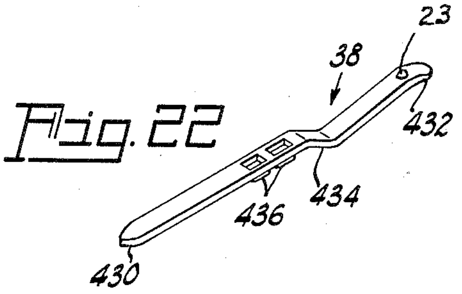
FIG. 22 shows a spring contact made by the process and machine disclosed herein.
Figure 23:
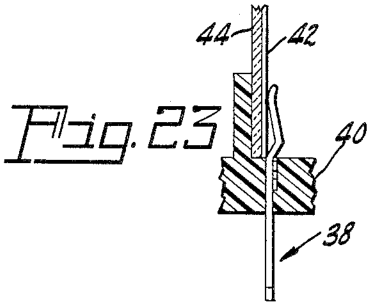
FIG. 23 shows the spring contact in assembled relationship with a mounting block and a contact card.

In general, and referring particularly to FIG. 1, a strip 12 of spring metal, such as tinned Phosphor bronze, is fed from a supply spool 14 through sets of straightening rolls 16 and 18, through a strip cleaning bath 20 and through a welder 22 whereat contacts 23 are welded onto the strip, the strip then passing through a hammer or contact peener 24, a clamp 26, then through a press 27 which includes a second horizontally reciprocating clamp 28 on a reciprocating slide 30, a sensing device 32 to sense the presence of a contact on the strip, a third clamp 34, and strip cutter and contact spring shaper assembly 36. After the contact spring 38, FIG. 22, is cut off from the strip, it is blown laterally into a chute, not shown, all as will be described in detail. The contact spring may be assembled with other contact springs in a block 40, FIG. 23, to contact contact strips, as 42, on a card 44.

The spool 14 on which the spring metal strip 12 is wound, the strip straightening rollers 16 and 18 and the cleaning bath 20 are conventional and need not be further described. The welder 22 welds small pieces of wire 50, which may be a gold alloy comprising mainly gold and silver in the ratio of 75 to 25, or other suitable electrical contact material, onto the strip 12. The welder here shown comprises an upright channel 52, U-shaped in cross section, supported on a table 54. Supported by a bracket 56 from a web of the channel is a sleeve guide 58 in turn supporting at its lower end a fixed cutter block 60 within which are pivoted carriers 62. To each of these carriers is secured, as by bolts 64, a cutter blade 66 having a cutting edge 67. Each of the carriers 62 has a long exteriorly arcuate shaft section 68, less than a semicircle in arcuate extent, journaled in the block 60. The interior portions of each shaft section provides a conical passageway 70 for reception of a conical pin 72 having a cylindrical threaded end 74 adapted to receive a washer 75 and nut 76 to hold the pin and carriers in place when they are assembled in the cylindrical bore of block 60, the washer bearing against the block and being pinned thereto against rotation, as by pin 77. Each of the carriers has pivotally mounted thereon, as by a screw 78, a shoe 80, slidable in an inclined way 82 in a tail piece 84 fixed to the lower end of a hollow shaft 86 slidable vertically in the sleeve guide 58. As the shaft 86 is reciprocated, the inclined ways 82, engaged with the shoes 80, will cause the carriers 62 to oscillate, thereby bringing the cutting edges 67 of the cutter blades 66 to engage and partially sever the wire 50 to form a contact segment below the blades. The wire 50 is fed through a small diametered passageway 90 in a long welding electrode 92 vertically slidable in an intermediate sleeve 94 in turn slidable in the hollow shaft 86.

Figure 20:
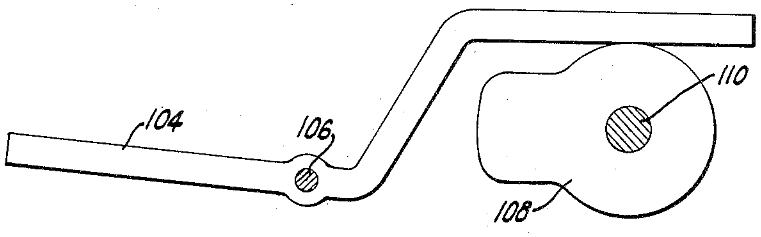
FIGS. 20 and 21 show cams and levers to operate parts of the upper electrode and its associated parts.

Reacting between the fixed sleeve guide 58 and a jam nut 98 screwed onto the hollow shaft 86, is a spring 100 tending to maintain the shaft 86 in raised position. Threaded on the shaft, above the jam nut, is an adjusting nut 102, surmounted by a washer 103. To lower the shaft 86, in order to close the cutter blades on the wire 50 in two stages of operation, is a lever 104, see FIGS. 3 and 20, pivoted on a stub shaft 106 mounted in the webs of the channel 52 and acted on by a cam 108 on a cam shaft 110, also supported by the webs, the end of the lever over the washer, in the raised position of the shaft 86, being loose and not pressing against the washer. When the lever 104 is operated to engage and depress the washer 103, the hollow shaft 86 will move against the force of spring 100 and along the sleeve 94 to bring the tips 67 of the cutter blades toward the wire 50.

Figure 21:
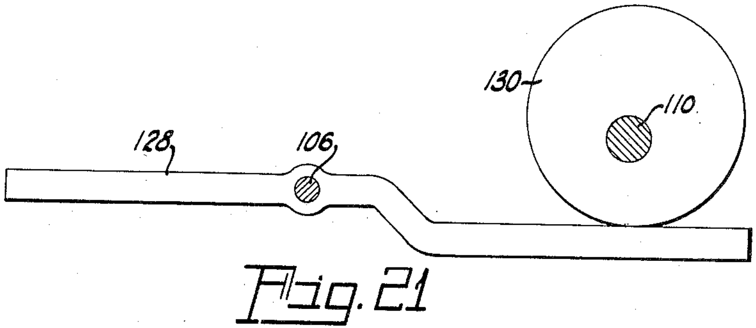

The upper welding electrode may form one terminal of a welding transformer and may be grounded either through the frame of the machine on which it is mounted or it may be connected by a cable to the transformer, as desired. The lower end of the electrode is provided with a pair of replaceable tips 112 held to the electrode in any suitable desired fashion, as by being fastened in substantially semi-circular sections 113 freely slidable in the sleeve 94 and fitting about a collar 114 on the lower end of electrode 92 with a space between the sections to allow movement of the sections toward each other. The lower end of each section has a conical upper face 118 adapted to be engaged, in the upper position of the electrode with respect to its intermediate sleeve 94, by the lower conical flare 120 at the lower end of the bore or passageway 90 running longitudinally of the sleeve, the engagement urging the sections and tips toward each other to frictionally but slidably hold the wire 50. To urge the welding electrode 92 and contained wire 50 and sleeve 94 with desired pressure down against the work, the sleeve 94 is provided with an integral collar 123 and the sleeve slides through a bearing 124 fastened to the bracket 56. A spring 125 reacts between the collar and bearing 124. To adjust the spring tension, a micrometer nut 126 and lock nut 127 are screwed onto the upper end of sleeve 94. To raise the electrode and sleeve 94, a lever 128 is employed, FIGS. 3 and 21, the same engaging a washer 129 beneath the collar 123. The lever 128 is driven by a cam 130 fixed on the shaft 110. Threaded on the upper end of electrode 90 is a knurled tension nut 131 reacting against a spring 132 seated against a collar 134 positioned on a reduced end of the sleeve 94. The spring 132 functions to raise the conical end of sections 113 against the conical surfaces 120 of the sleeve 94 and thus cause the sections 113 to move together and frictionally slidably clamp the wire 50 between the sections 113 and tips 112.

Figure 5:
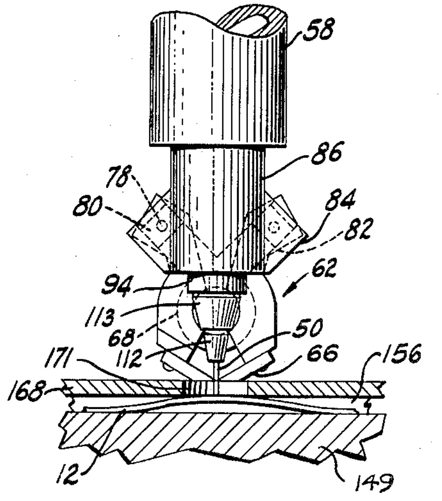
FIG. 5 is a similar view showing the cutter blades closed and the contact strip pulled up against a stop plate.
Figure 6A:
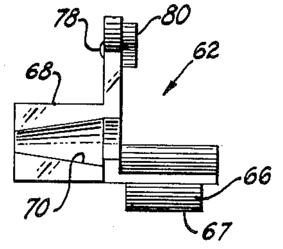
FIG. 6*a* is a side elevation of cutter blades.
Figures 7, 8:
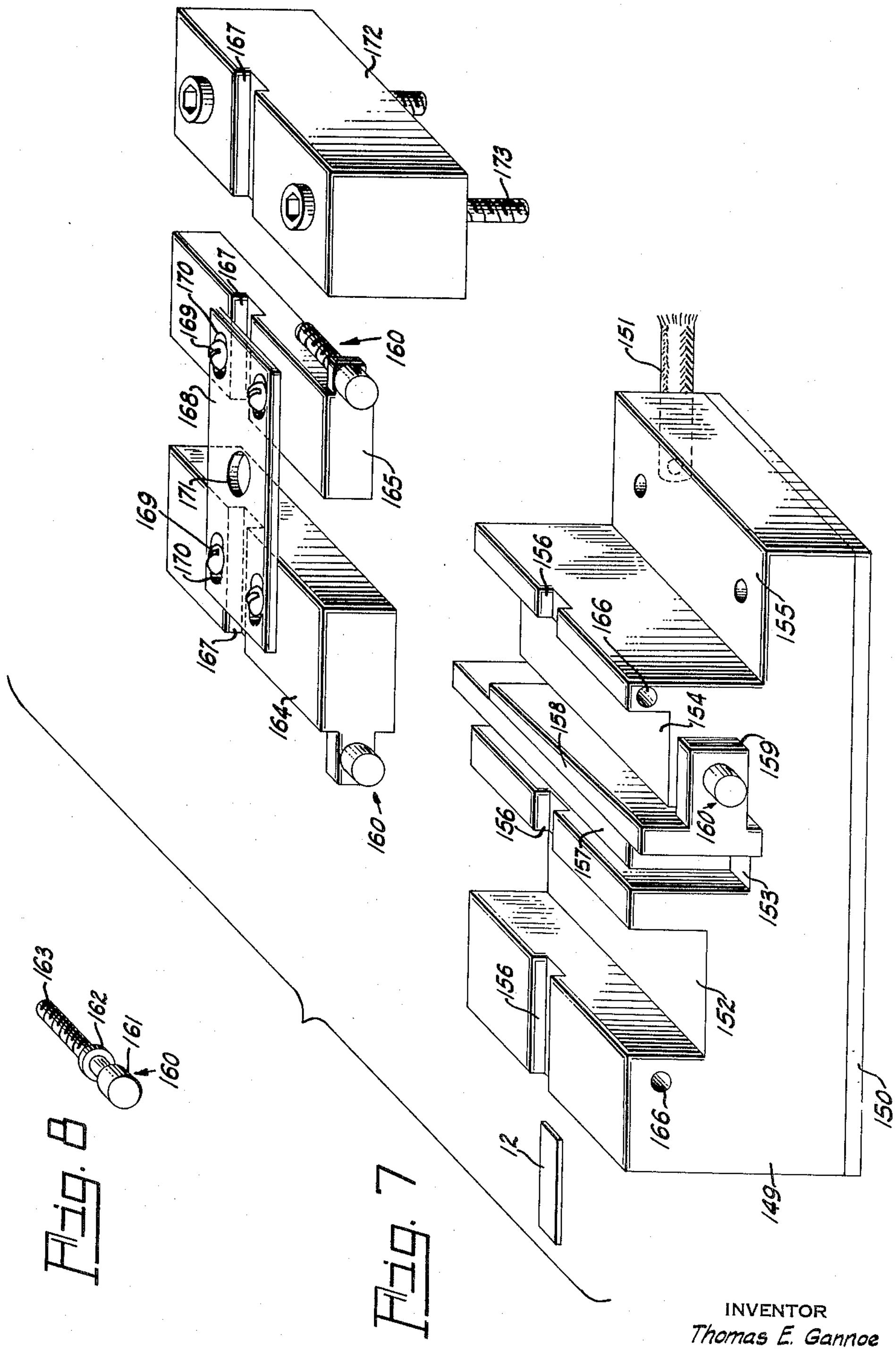
FIG. 7 is a view of the lower electrode, partially exploded.
FIG. 8 is a perspective view of a collar screw used in the organization of FIG. 7.

The strip 12 is fed across a bottom electrode consisting of a conductive block 149, FIGS. 5 and 7, insulatingly secured to the table 54 with an insulating spacer 150 between the block and table. A cable 151 is fastened to the block and leads to the low voltage output end of the welding transformer. As stated heretofore, the other output end of the transformer may be grounded to the frame of the machine or be directly connected to the electrode 92. The upper surface of the block is provided with three transverse channels 152, 153 and 154 and an end shoulder 155. The block is also provided with segments 156 of a longitudinal channel which, preferably, is as wide or wider than any strip material 12 which may be handled by the machine. Mounted on the central transverse channel 153 is an electrode strap 157 which may be adjusted manually longitudinally of the channel 153 or which may be inverted should the upper surface of the strap become pitted. This strap conducts the current directly to the underside of strip 12 which is fed across its upper surface and pressed down against it by the wire 50 engaging and pushing down on the strip 12. To maintain the strap in adjusted position, there is provided a wedge 158 having an ear 159 in which is rotatable an adjusting screw 160, see FIG. 8, having a knurled head 161 to engage the front of the ear 159, a collar 162 to engage the rear of the ear and a thread 163 to engage, as desired, more or less with a threaded opening in the block 149. The wedge 158 may thus be tightened or loosened as desired. Adjustable longitudinally in the channels 152 and 154 are the stop plate supporting blocks 164 and 165, these being provided with ears and screws 160 similar to the ear 159 and screw 160, previously described. The screws 160 in the blocks 164 and 165 are threaded into threaded openings 166 in the block 149 to laterally adjust channels 167, the channels being of a width to snugly accommodate the width of strip 12 and thus ensure welding a contact dot on the strip exactly where desired, laterally of the strip 12. Bridging the blocks 164 and 165 is a stop plate 168, see also FIG. 5, this plate being longitudinally adjustable on the blocks 164 and 165 by means of screw and slot connections 169, 170. The plate has a hole 171 therethrough immediately above the lower electrode strap 157 to enable the wire 50 to pass therethrough to weld onto the strip 12, the hole being large enough to allow the welded-on contact, which is larger in diameter than the wire itself, to pass up through the plate. The plate is selected to be of a thickness equal to the length of wire 50 to be welded onto the strip so that when the wire is cut off, as will be described, there shall be no waste wire and the height of all of the contact dots on the strip will be the same in height and area on the strip. In the process of welding the wire onto the strip, the strip, after the wire is welded to it, is pulled up by the wire into contact with the lower face of the plate, as in FIG. 5, and the wire is then partially severed to weaken it substantially level with the upper surface of the stop plate. In FIG. 5 the degree of lift of the strip 12 is exaggerated to better show the invention. In actual practice, the strip is thicker relative to the depth of the groove or the plate has a rib extending down into the groove. The wire, often, is only substantially severed and not completely severed since the cutting edges 67 of the blades do not contact one another and thus do not dull by coming into contact. The wire is finally severed by a slight rise of the electrode assembly subsequent to the wire nipping operation and by consequent pull on the wire frictionally held by the tips 112. By reason of this operation, it is assured that any dot or contact that remains on the strip has firm adherence thereto. An end block 172 fastened to the shoulder portion 155 of block 149 completes the bottom electrode assembly, this end block being secured to the block 149 by screws 173 and being provided with a channel portion like channel portions 167 on blocks 164 and 165 and of the same size, the block 172 extending to the contact dot hammer or peener 24.

The mode of operation of the welder is as follows: Initially the wire is threaded manually through the passageway 90 in the electrode 92 and through the tips 112. The passageway in the tips is of such size as to cause a snug slidable fit of the wire so long as spring 132 is operating to pull the conical surfaces 118 of the tips in engagement with the conical flare 120. The spring 132 is of such tension as to allow the wire to be pulled through the passageway and tips after the wire has been welded to the strip but yet is strong enough to part the wire from the contact welded onto the strip after the wire has been initially partially severed by the blades 66, if, in fact, complete severance has not taken place. It happens that, even though the blades do not actually contact each other, due to the character of some wire, complete separation of the wire does take place.

After the wire has been initially positioned, the machine is started. Rotation of cam 130 will cause the free end of lever 128 to move downward away from washer 129 to allow the spring 125 to lower the electrode 92 and sleeve 94 to positions such as to bring the end of the wire 50 into contact with the strip 12 and press the strip down onto the lower electrode strap 157. Then the welding current is turned on by reason of closure of a microswitch 174 in the circuit of a welder transformer 175, the switch being closed by a cam 176 on shaft 110. During the welding operation, as the wire fuses, the spring 125 will expand further to follow the melting of the wire and lower the upper electrode assembly. During this period the cam 108 has rotated to operate the lever 104 to engage and depress sleeve 86, compressing spring 100, to bring the blades 66 close to but still out of contact with the wire. The cam 130, after the welding operation has ceased, then partially lifts the sleeve 94 and electrode 92 to bring the strip 12 hard up against the stop plate 168 and pull some wire through the passageway 90 for a subsequent welding operation. At this time the cam 108 functions to lower the hollow shaft 86 sufficiently to operate the blades 66 to a degree to almost but not completely come together, to prevent knife edge dulling, to cut into the wire and then to separate the blades. As the cam 130 continues to rotate, the lever 128 is raised placing greater pressure on spring 125 and causing a rupture of the wire 50 if it had not already been severed by action of the blades. Thus, in case the wire is not at first severed, the weld is tested. If it were a poor weld, the end of the wire would separate from the strip when the wire is pulled to sever the wire at the cut-into portion; and the wire is severed at an exact height above the strip since the height of the contact is determined by the thickness of stop plate 168 and the closeness of the blades to the top of the plate. After the wire is cut or nicked deeply, the cam 108, in its rotation, allows the lever 104 to release the pressure on spring 100 to enable it to raise the sleeve 86 and open the cutter blades. The cycle is thus completed. A new cycle now begins with the lower end of the wire 50 in a proper position to start.

Figure 9:
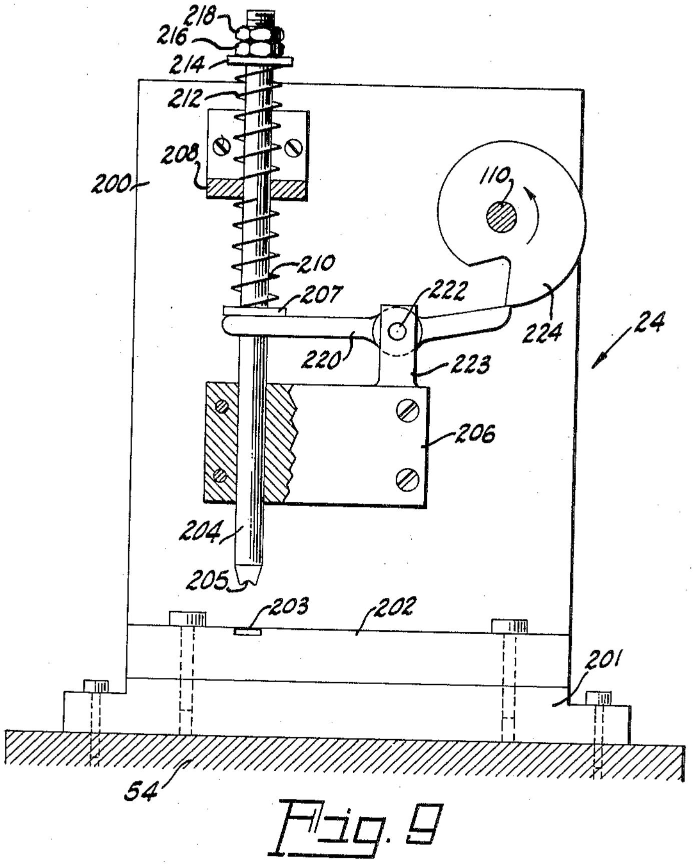
FIG. 9 is a side view of the peener taken on the line 9—9 of FIG. 1.
Figure 24:
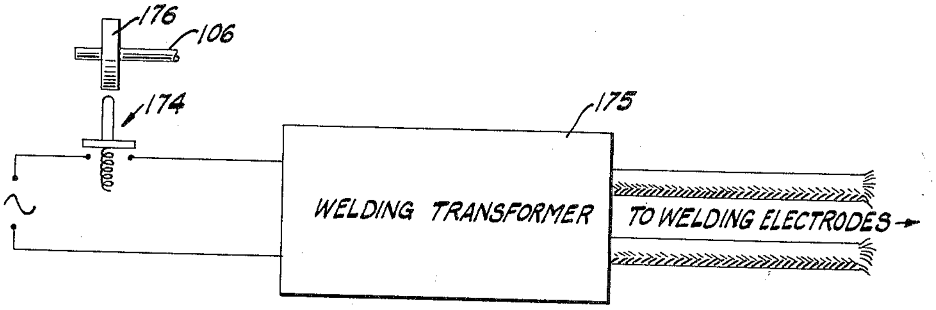
FIG. 24 is a diagrammatic view of a welding circuit.

After the gold alloy dot 23 has been welded onto the strip, the strip is drawn through the channels 156 and 167 into the peener 24, see FIG. 9. The peener comprises an angled frame plate 200 mounted on a spacer 201 in turn fastened to the table 54. The horizontal angle 202 of the frame plate is provided with a channel 203 of a size and in line with the channel 167 and the channel is extended through the vertical angle of the frame plate. To peen the gold dot into a semispherical shape, there is provided a plunger 204 having a rounded hollow 205 in its bottom end to properly shape the contact dot, and spring means under cam control to operate the plunger. The plunger reciprocates in a long bearing in a block 206 and has fixed on it, by welding or otherwise, a collar 207. A frame bracket 208 guides the upper portion of the plunger and a stiff spring 210 is entrained between the collar and bracket. A second, much lighter spring 212 reacts between the bracket and a washer 214 held to the top of the plunger by a nut 216 and lock nut 218. To raise the plunger there is provided a lever 220 mounted on a stub shaft 222 supported by standards 223 extending upwardly from the block 206 and whose forked forward end straddles the plunger 204 and underlies the collar 207. The rear end of the lever engages a cam 224 with a sharp drop and fastened on shaft 110. At the instant of release, the plunger moves with the impetus imparted thereto by the compressed spring 210 to a position beyond that afforded by the expansion of the spring. The plunger then compresses spring 212, which then reacts to restore the plunger to normal position. Thus, under operation of the cam and lever, the collar 207 and plunger first move upward to compress the spring 210, then the plunger forcibly moves downward to form the dot contact on the strip and the plunger is lifted by the light spring 212 atop the bracket 208 to where the bottom of the plunger is above the strip, the lever 220 at this time being out of engagement with the collar 207 and the spring 210 expanded.

The cam shaft 110 is driven through the intermediary of a chain drive 230, FIG. 1, from a crankshaft 232 in turn driven by a pulley and belt drive 234, the belt being driven by a motor, not shown, and the crankshaft being journaled in bearings 236 on a vertical web 238 of the frame. The crankshaft drives the press 36 as will be explained.

Figure 11:
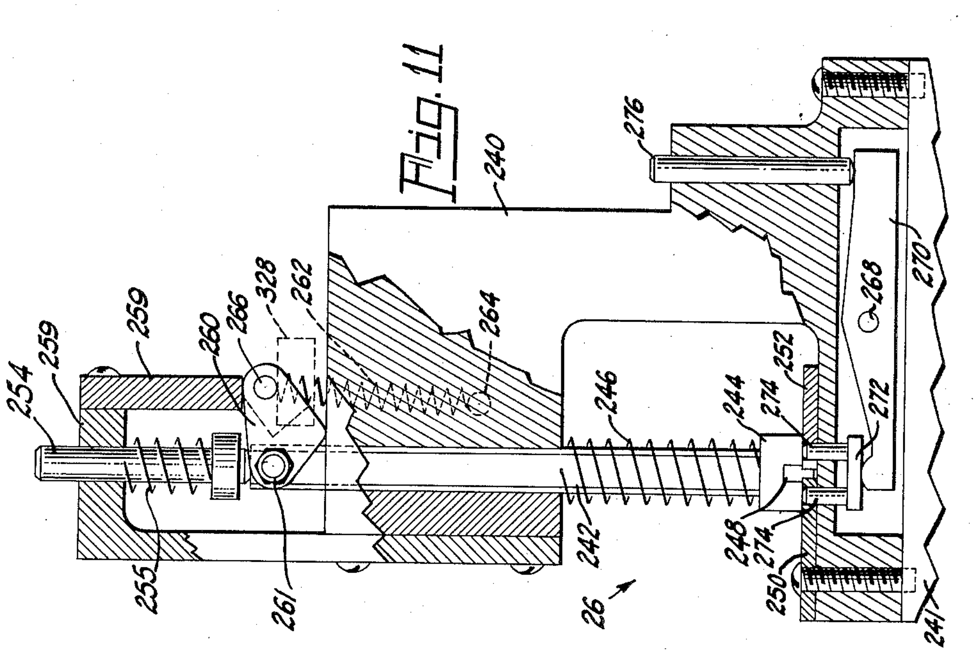
FIG. 11 is a similar view showing the parts in clamping position.
Figure 10:
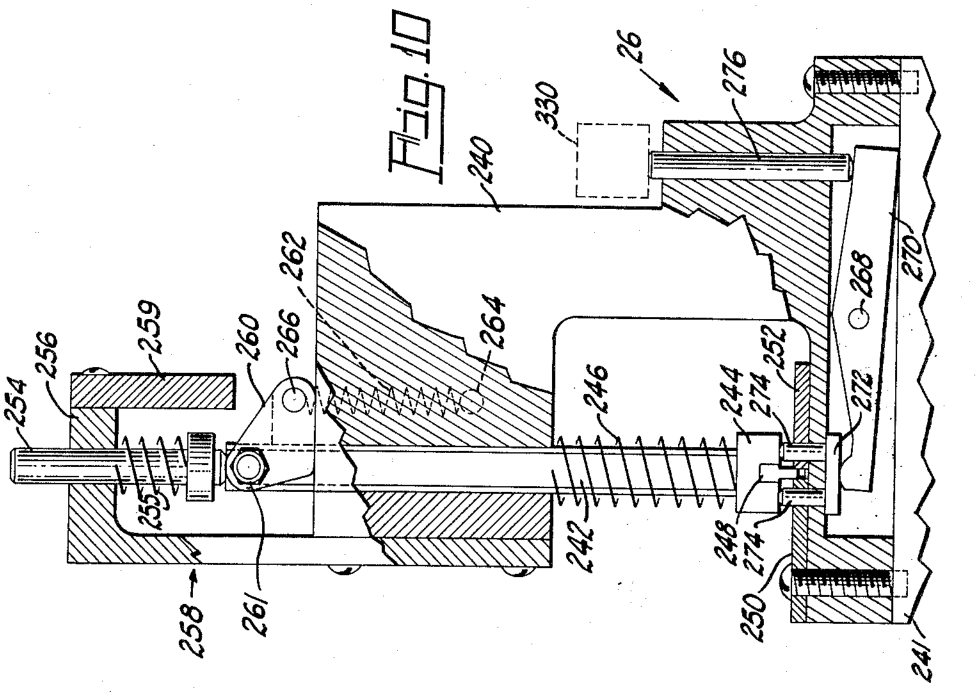
FIG. 10 is a vertical side elevation through a strip clamp, mostly in section, showing parts in non-clamping position and taken on the line 10—10 of FIG. 2.

Between the press and the peener is the clamp 26, see FIGS. 10 and 11. The clamp 26 comprises a frame 240 mounted on the table 54 through the intermediary of a spacer plate 241 and slidably mounts a push rod 242 having a clamp block 244 secured to its lower end of larger width than the rod to accommodate a spring 246 compressed between the clamp block and the frame 240. The clamp block has secured therein a blade 248 having a lower portion to fit snugly in the space between the cover plates 250, 252 fastened to the frame 240, the space between the plates being in alinement with the channel 203 in angle 202 of the peener and snugly accommodating the strip 12. Applying additional clamping force to the clamp is a push rod 254 loaded with a spring 255 and slidable in the horizontal arm 256 of a bracket 258 fixed to the frame 240. A stop plate 259 is bolted to the free end of horizontal arm 256 to limit the overthrow of a lock plate 260, as will be explained. The lock plate is mounted on a pivot 261 on the upper end of push rod 242 and a spring 262 normally moves the plate to the position shown in FIG. 10, the spring reacting between a pin 264 fixed to frame 240 and a pin 266 on the plate 260. In the position shown in FIG. 10, the lock plate is in overcenter position with a portion flat on the frame 240, the pressure of the springs 255 and 246 holding the plate in the position shown in FIG. 10 and the clamp is held in released position. In FIG. 11, the stop plate is shown in the position where the clamp is operative. It will be explained later that the pin 266 is operated by a portion of the press to bring the stop plate from the position shown in FIG. 10 to that shown in FIG. 11. In order to raise the clamp block 244 to release the strip and to allow the spring 262 to move the stop plate from the position shown in FIG. 11 to that shown in FIG. 10, there is pivotally mounted, on a pivot pin 268 in a recess in the foot of frame 240, a lever 270 whose forward end abuts a plate 272 mounting two pins 274 and which pins pass through the upper horizontal wall of the recess into abutting engagement with the bottom block 244. Vertically slidable in a rear extension of the frame 240 is a vertical pin 276 adapted to be engaged by a part on the press head, as will be explained, to depress the vertical pin and, through the lever 270 and pins 274, raise the clamp block against the action of its springs. Therefore, as will be seen, the clamp block is operated through movement of press head carried parts.

Figure 2:
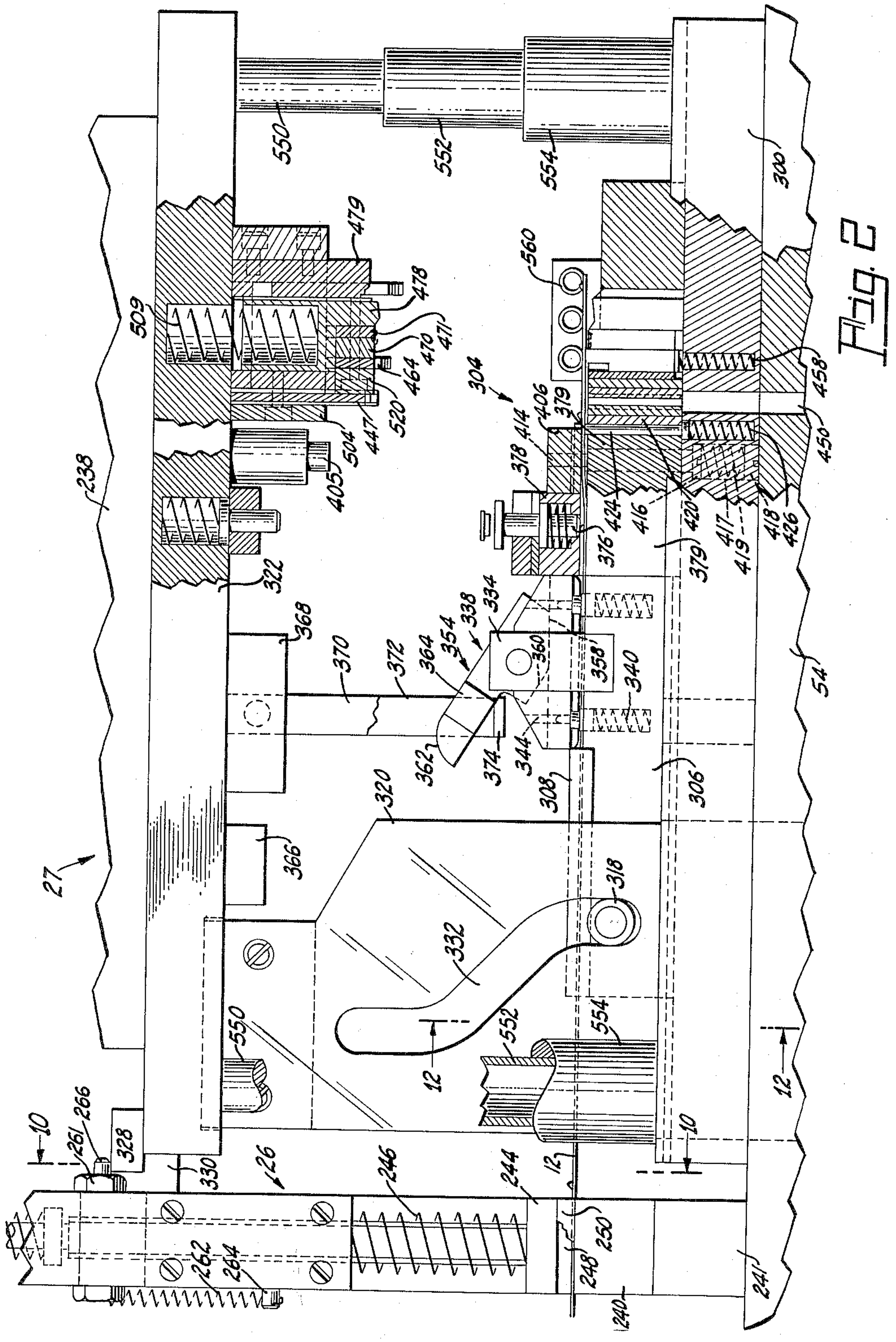
FIG. 2 is an enlarged vertical elevation of the die end of the machine.
Figure 12:
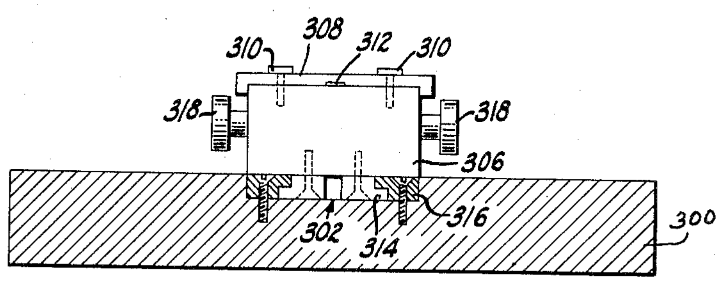
FIG. 12 is a section on the line 12—12 of FIG. 2 with vertical cam plates removed.

To the right of the clamp 26, FIGS. 1 and 2, is the sensing, cutting and forming press indicated generically as 27. The press, see FIG. 2, includes a bed plate 300 mounted on the table 54; in the bed plate is a way 302, see FIG. 12, extending throughout the length of the plate. In the right half of this way, as seen in FIG. 2, is an assembly 304 fixedly mounting parts of sensing and brake mechanism, and cutting and forming dies for the contact spring, as will be described. To the left of this assembly is slidably mounted a clamp slide 306, see FIG. 12, having a cover plate 308 secured thereon as by screws 310 and having a channel 312 therein for the passage of the strip 12 and its contacts thereon. To provide a guide for the movement of the slide, it is fitted with angle bars 314 cooperating with angled rails 316 secured to the bed plate 300. The clamp slide 306 is provided with a pair of cam follower rollers 318 cooperating with a pair of cam plates 320, FIGS. 1 and 2, depending from the under face of a press head 322 and whose lower edges are movable, on downward movement of the cam plates, through suitable slots cut through the block 300 and table 54. The press head is connected to the crankshaft 232 by a connecting rod 324 between the crank of the shaft 232 and a universal ball and socket joint 326 secured to the press head. To operate the clamp block 244 previously described, there is mounted on the head the thin plate 328 and thick plate 330, these plates being properly spaced apart to be under the pin 266 and over the pin 276. Toward the end of the upstroke of the press head, the pin 266 will be engaged and moved by the plate 328 and the clamp will close. Toward the end of the downstroke of the press head, the pin 276 will be engaged by the plate 330 and the clamp will be opened.

As the press head moves down from the position shown in FIG. 2 to that shown in FIG. 1, the cam slots 332 in the plates 320 will shift the rollers 318 and the clamp block 306 to the left.

Figure 13:
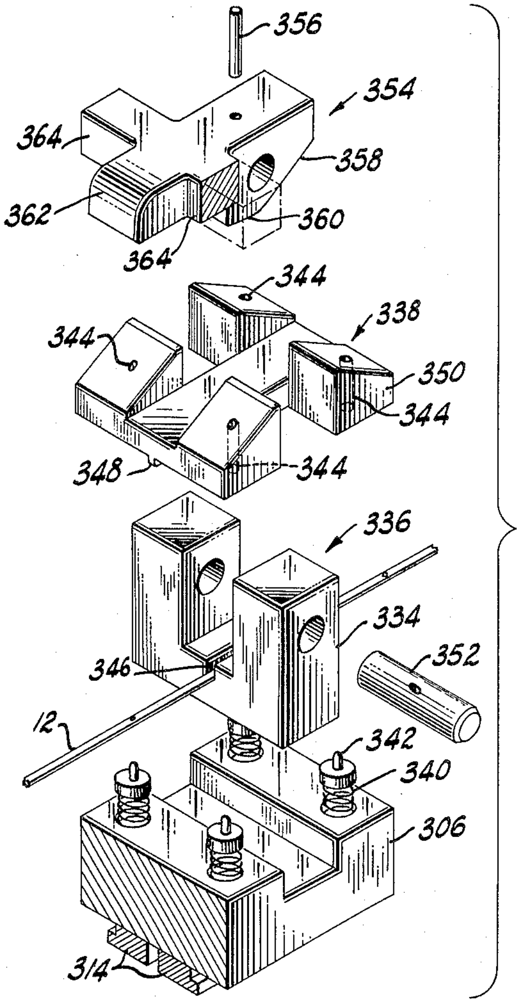
FIG. 13 is an exploded view of clamping mechanism utilized to pull the strip through the machine, parts being shown in section.

Carried by upright arms 334, see FIG. 13, of a U-shaped piece 336 set into the clamp block slide 306 is an upper clamp spider 338, normally pressed upwardly by a group of springs 340 seated in pockets in the end of slide 306, the springs being capped with centering inverted cups provided with pins 342 entering the lower ends of the openings 344 in the spider. The bottom of the U-shaped piece is provided with a channel 346 in line with and of the same width as the channel 203, and the spider is provided with a rib 348 fitting in the channel 246 and adapted to clamp the strip 12 against the bottom of the channel when the clamp is closed. The spider is generally H-shaped in plan and is guided in its vertical motion by the inside faces of the legs 350 of the spider engaging the side faces of the legs of the U-shaped piece. Pivotally mounted in the U-shaped piece by a pivot pin 352 is the pivotal clamp block 354, the same being secured to the pivot pin by a dowel 356. The block 354 has a cam face 358 which in the position shown in FIG. 2 allows the springs 340 to function to raise the rib 348 from off the strip 12 and a second face 360 which in the position shown in FIG. 1 causes the rib 348 to clamp and hold the strip 12 to the slide. The clamp block 354 is provided with a cam finger piece 362 to be pressed down upon to close the clamp and a pair of wings 364 which, when a thrust is applied to the undersurfaces thereof, effects a release of the upper clamp block to the action of the springs 340. To operate on the finger piece 362, the underside of the press head 322 has affixed thereto a pad 366, which, when the head comes down and the cam plates 320 have moved the slide to the left to the position shown in FIG. 1, engages the finger piece and closes the clamp. Upon raising the head, the slide and closed clamp move to the right, pulling the strip 12 through the machine and under the welder. Thus, a new position is provided on the strip for applying a gold dot contact thereto. Also secured and depending from a block 368 fastened to the underside of the head is a pair of clamp opening fingers 370 and 372 having short horizontal arms 374 to engage beneath the wings 364 to open the clamp jaw in the final upward movement of the head and just as the slide and clamp have completed their stroke to the right to the position shown in FIG. 2. The slide and clamp are now free to move to the left to take a new bite on the strip, the clamp block 244 at this time being in its down, strip holding position. In effect, the clamp block 244 and clamp spider 338 form a hand-over-hand feed for the strip 12.

Figure 14:
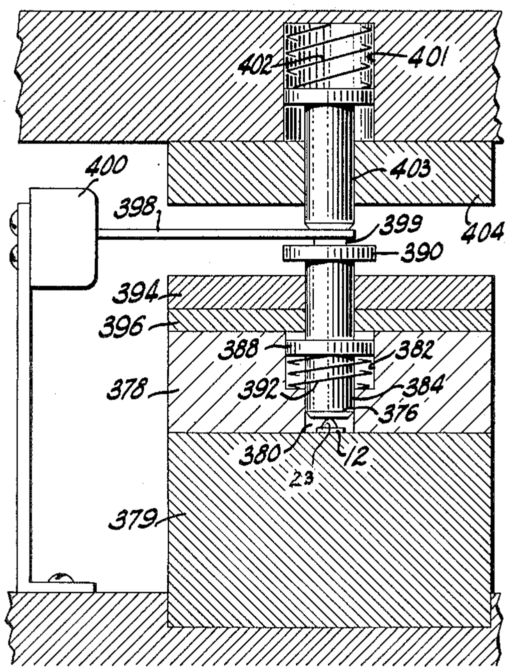
FIG. 14 is a section on the line 14—14 of FIG. 1, showing parts of the sensing mechanism when a contact dot is properly located on the strip.
Figure 15:
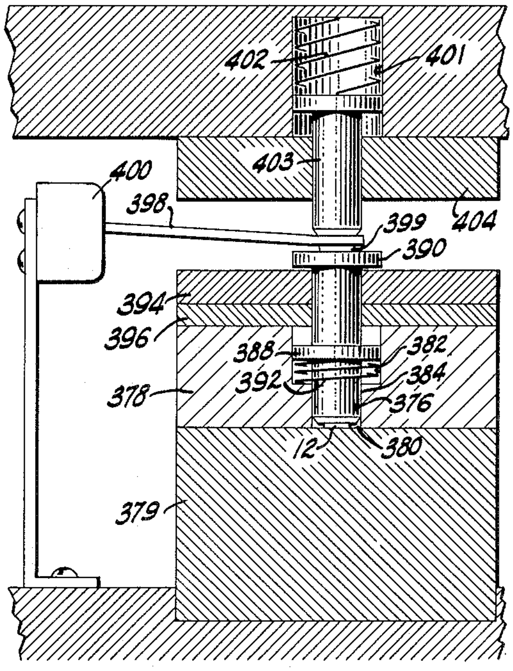
FIG. 15 is a similar view but with the sensing parts in position in the absence of a contact dot on the strip.

When the strip, with the contacts thereon, is pulled through the machine, it passes beneath a sensing pin 376, see FIGS. 14 and 15, seated in a recess in a block 378 secured on the leftmost block 379 of the assembly 304, as seen in FIGS. 1 and 2, the block 378 being channeled, as indicated at 380, to accommodate the length of strip. Centrally of the block there is a recessed portion 382 and a smaller diametered portion 384 to accommodate the sensing pin 376 having an intermediate shoulder 388 and a head 390. A light spring 392 seated in the recess 382 maintains the pin in an up position, the downward motion of the pin being limited by either the top of the dot or the upper surface of the strip 12 should a dot be absent. A closure plate 394 and a spacer plate 396 close off the recess 382. Above the sensing pin is a blade 398 having a padded end 399, the blade forming part of a microswitch 400 connected in with the circuit to the motor which drives the machine to cut off the motor and apply a brake to the machine in the event the arm moves to a low position, as when there is no dot on the strip to limit the motion of the sensing pin. The press head is recessed as at 401 above the sensing pin to accommodate a light spring 402 and plunger 403, the downward limit of motion of the plunger being limited by a stop plate 404 fastened to the head. In the presence of a dot on the strip, on descent of the head, as seen in FIG. 14, there will be insufficient pivoting of the blade 398 to operate the switch 400. However, in the event of failure of application of a dot to the strip, the blade 398 will be pivoted, as shown in FIG. 15, so that the switch will be operated to stop the motor and apply the brake to the machine.

Figure 16:
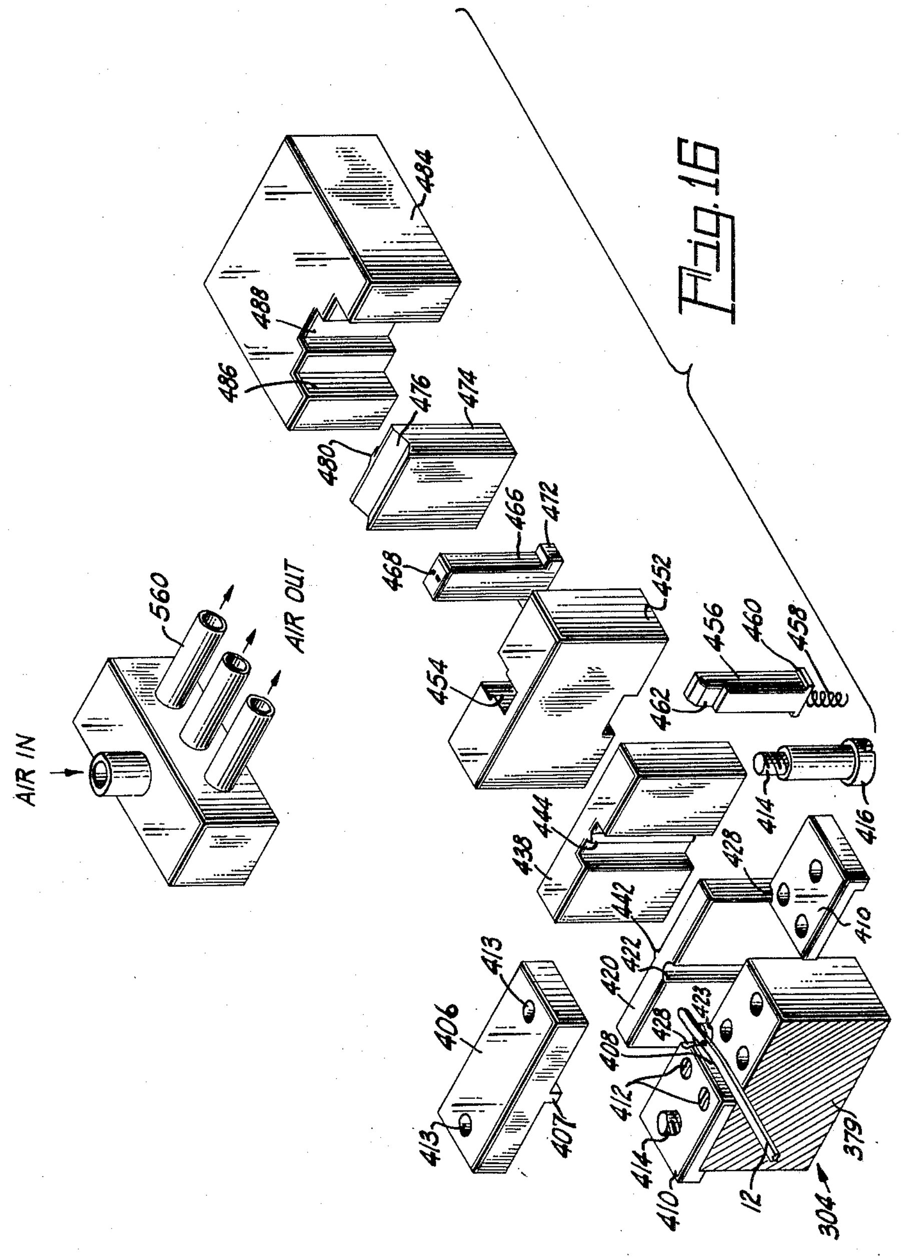
FIG. 16 is an exploded view of a clamp block, spring cutting and die forming assembly, the figure also showing means for blowing a cut and formed spring contact out of the press.

After being sensed, the strip and contact is fed over a combined strip cutter and former. Prior to such cutting and forming and as an incident to the press head moving down to perform these operations, the strip is again clamped against movement. This is effected by a spring pressed plunger 405, FIG. 2, mounted on the head, engaging a clamp block 406, see FIG. 16. The clamp block is provided with a transverse rib 407 adapted to operate in a channel 408 formed between two plates 410 mounted on the end block 379 of the assembly 304. In the block 379 are four tapped holes accommodating screws 412 which pass through the plates 410 to secure them in place. To urge each clamp block upwardly, the same has screwed therein, as in a tapped hole 413, a shouldered screw 414, the head 416 of which extends below the block 379. Each head rides in a recess 417, FIG. 2, in the bed plate 300 in the bottom of which is positioned a screw 418; a spring 419 is interposed between the head and screw to urge the clamp block upwardly. Next to the block 379, FIG. 16, is a cutter die slab 420, the adjacent surfaces of the block 379 and slab 420 being arcuately recessed as indicated at 422 and 423 to accommodate a stripper pin 424 pressed upwardly by a spring 426 to urge the free end of the strip up above the surface of the lower die slab and thus prevent its free end from inadvertently abutting the next adjacent die edge. To accommodate the upward movement of the stripper pin, the plates 410 have arcuate cutouts 428.

Figure 18:
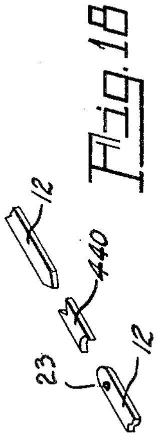
FIG. 18 is a diagrammatic view illustrating how a slug is cut out from the spring strip.

Since the cutting and forming die sets may be varied to suit the particular shape of contact spring to be manufactured, the example here given is merely illustrative of the process and structure of the invention. The contact spring 38 of FIG. 22, it will be noted, has a pointed end at 430, a rounded end at 432 and, besides being offset longitudinally as at 434, has spring fixing dimples 436. The die slab 420 and an adjoining die slab 438 enable the cutting out of a slug, as slug 440, FIG. 18, from the strip 12 to form the trailing end of one spring contact and the leading end of a potential spring contact. For this purpose, the die slab 420, screwed to the plate 300, has a rounded nose portion 442, and the die slab 438, also screwed to the plate 300, has a pointed nose portion 444. To accomplish the punching out, the head 322 has fastened thereto the punch 446, FIG. 17, the punch being comprised of two bars 447 with beveled ends 448, the beveled ends locating the strip 12 centrally of the bars 447 and the dies. The punched out slug can drop out or be forced out of the machine through the passageway 450.

Next to the die slab 438, FIG. 16, is a spacer block 452 fastened to the plate 300. Within a channel 454 in the spacer block is a slidable stripper post 456 urged upwardly by a spring 458 seated in a recess in the bed plate 300 to lift the contact spring 38 of the lower dies after the spring has been formed and cut off from the strip, shoulders 460 on the post cooperating with the bottom of the spacer block 452 limiting the upward motion of the stripper post. A side face of the post 456 is recessed as at 462 to accommodate the tines of a locator 464, FIG.

Figures 17, 19:
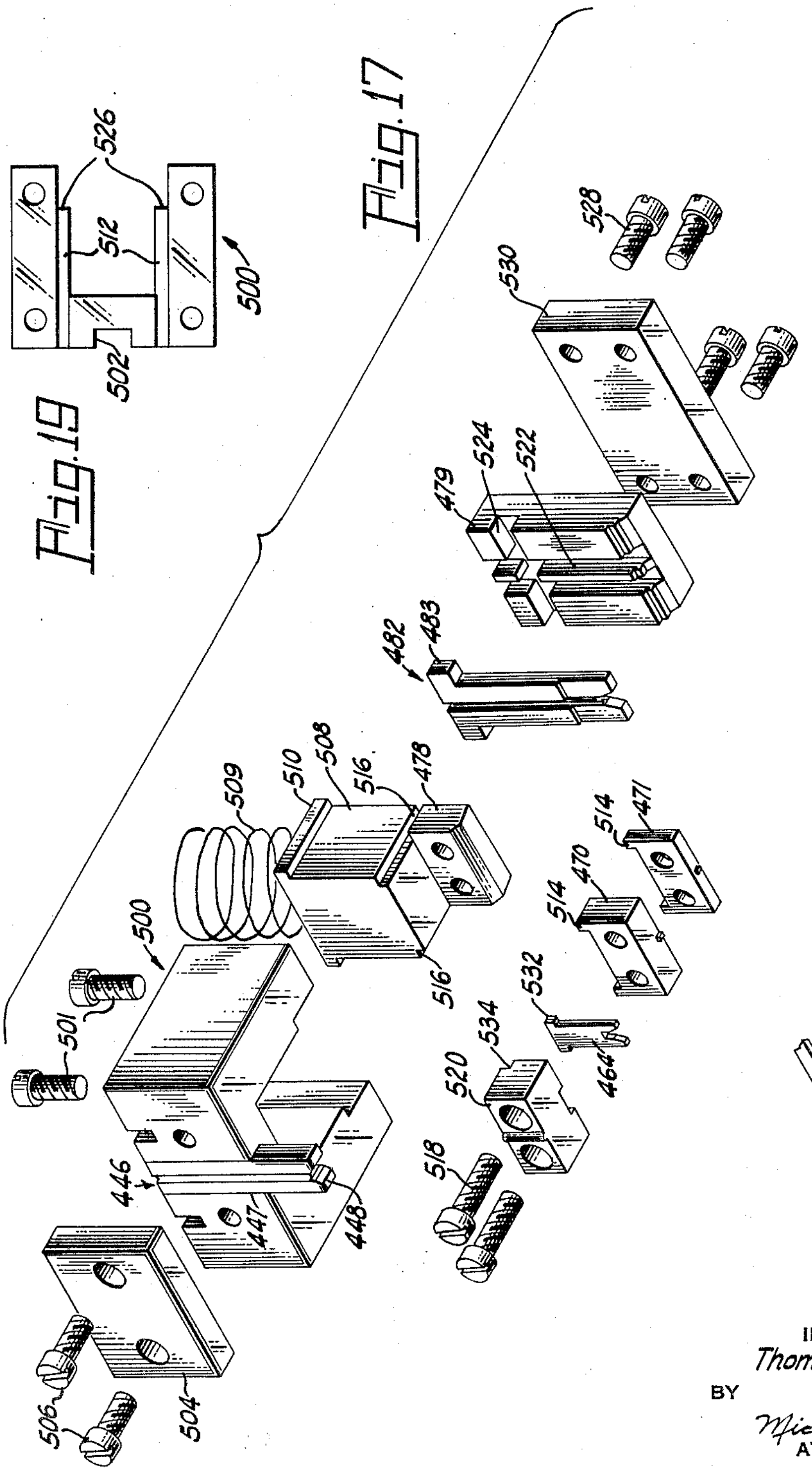
FIG. 17 is an exploded view of elements cooperating with the assembly of FIG. 16 to properly guide the spring strip, cut the contact spring from the strip and form the spring.
FIG. 19 shows in plan view one of the elements illustrated in FIG. 17.

17, mounted on the head as will be described. Within a wider recessed portion of the spacer block 452 is a die 466 with recesses 468 therein to enable the formation of the dimples 436 on the contact spring 38. The head, see FIG. 17, has mounted thereon, in a manner to be described, the mating dimple forming dies 470 and 471. The lower dimple forming die 466 is held in place by shoulders 472 lying snugly between the top face of bed plate 300 and the under face of spacer block 452. Next to the lower block 452 and lower die 466 is the lower former die 474, fastened to the bed plate 300, the upper end of which is configurated, as at 476, to help form the bend 434, FIG. 22, in the spring 38. Mounted on the head and cooperating with the die 474 are the upper dies 478 and 479. On the right-hand side of lower die 474 is a rib 480, straddled by head carried locators 482. A lower end block 484, screwed to the bed plate, has a wide recess 486 to accommodate the lower die 474 and a second recess 488 to accommodate the rib 480 and the locators 482. The top die assembly, FIG. 17, consists of a support 500 fastened to the underside of the head as by screws 501. It is U-shaped in plan view, as seen in FIG. 19, and recessed at the side, as indicated at 502, to accommodate the punch and locator 446. An end plate 504 and screws 506 clamp the punch and locator 446 in place. The former 478 is part of a hollow box 508, spring pressed downwardly by a stiff spring 509 seated in the box and reacting against the press head 322. The box and die are limited in their downward motion by flanges 510 engageable with recessed shoulders 512 in the support. Carried by the box are the dies 470 and 471 and the locator 464, the dies having flanged ends 514 engaging shoulders 516 on the bottom of the box. The parts are clamped against the die 478 by suitable screws 518 and an end block 520, as will be apparent by inspection of FIGS. 2 and 17. The locators 482 are flanged as at 483 and are seated in vertical and transverse recesses 522 and 524 in die 479 and the locators 482 and die 479 are frictionally held to the support 500, with the left-hand face of the die 479 against shouldered portions 526 in the support 500 by suitable screws 528 and an end plate 530, the screws being threaded into the ends of the legs of the U-shaped support. The locator 464 is flanged as indicated at 532 to engage with the shoulder 534 on the end block 520.

The press head is guided in its vertical movement by four posts 550, one at each corner of the head riding in shiftable roller bearing guides 552, 554 secured to the bed plates. This is a conventional form of sliding connection and may be replaced by any other well-known form of slidable connection.

Figures 3, 4:
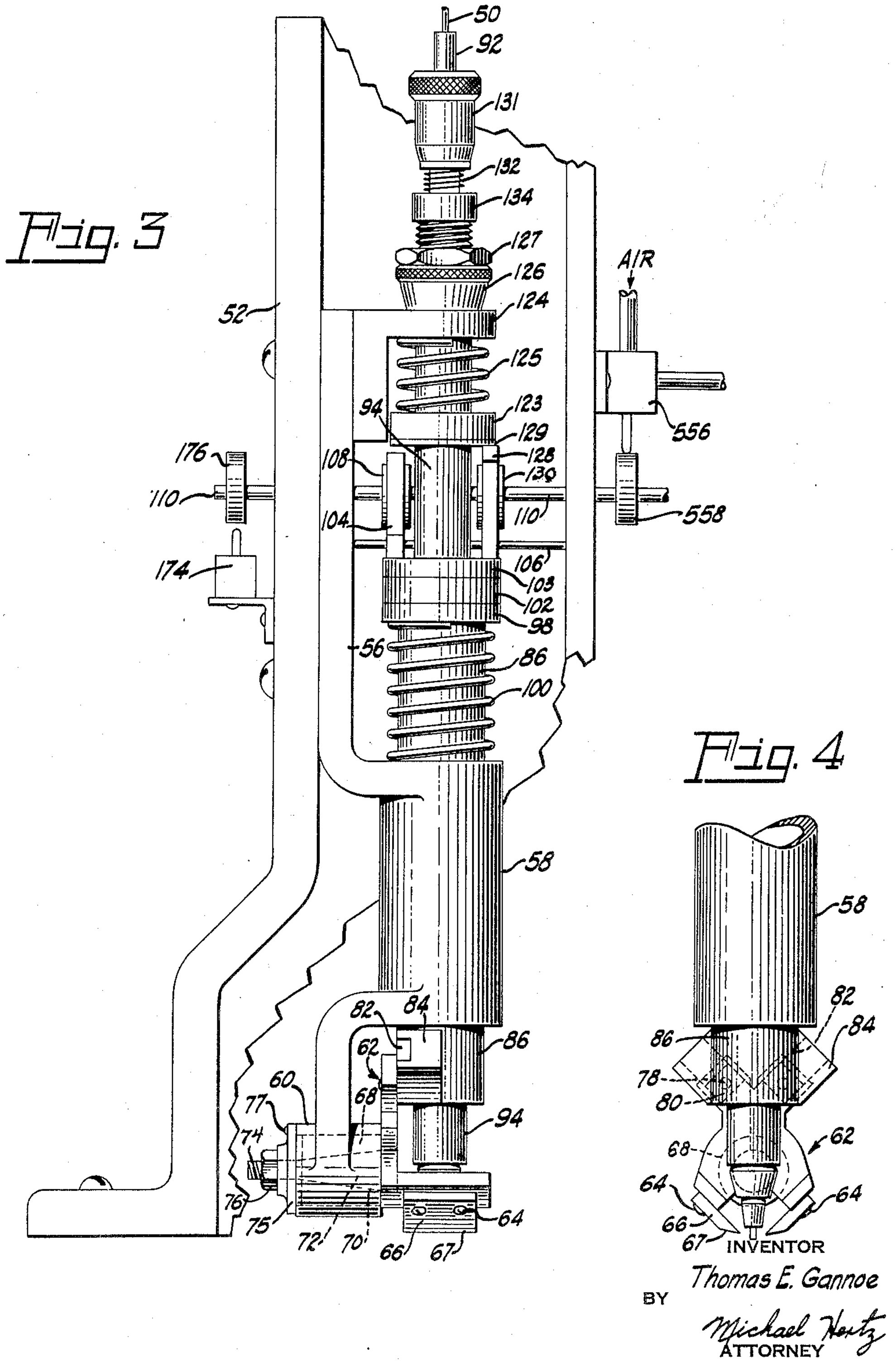
FIG. 3 is a front view of an upper welder electrode and associated parts.
FIG. 4 is an end view of the lower end of the electrode and associated cutter.
Figure 6:
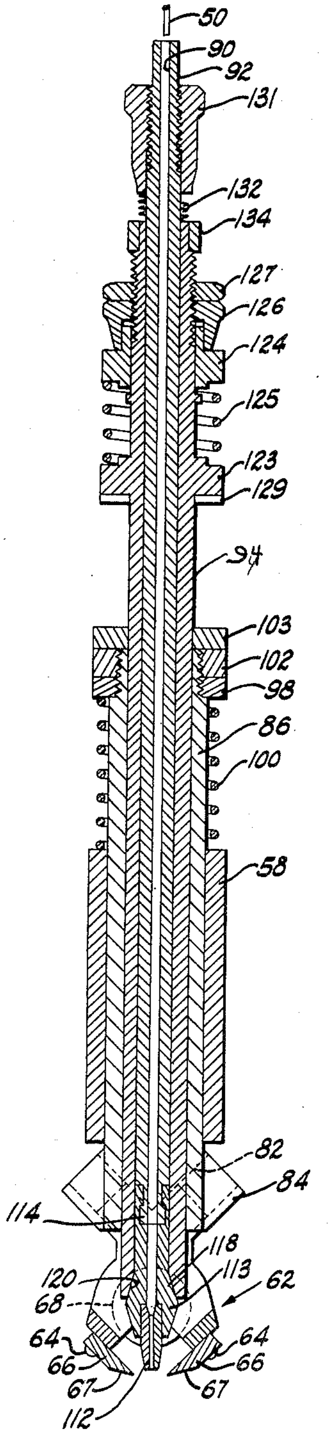
FIG. 6 is a section through the welder electrode of FIG. 3.

On the rise of the head, a valve 556, FIG. 3, under control of a cam 558 on the cam shaft 110, causes a puff of air to be emitted from nozzles 560, FIGS. 2 and 16, positioned on the machine directly on a level with the cut-off contact spring and behind the same to blow the spring forwardly into a chute and collection box, not shown, fastened to the front of the machine.

The timing of the machine is such that the welding operation takes place much later than the cutting out and forming of the contact spring by the press, so that any vibrations which may have taken place in the machine would die down and thus not affect the weld. Preferably, the cams on shaft 110 are so arranged and contoured to cause the welding to take place just after initiation of descent of the press head. Likewise, the peening of the contact is effected, by proper cam contour and positioning on the shaft 110, just before contact spring cutting off and forming, all to enable any vibrations created by the peening and press operation to die down before welding. This timing ensures very few failures in welding of the gold alloy to the contact strip.

Having thus described the invention, what is claimed is:

1. In combination, a reciprocatable welder electrode having a passageway longitudinally thereof for feeding a wire therethrough, a wire cutter at the wire exit end of the passageway, a cooperating fixed electrode across which a metal strip is intermittently fed, a welding transformer connected to the electrodes and switch means to control the transformer, a first clamp, a second longitudinally reciprocatable clamp operating in time overlapping alternation with said first clamp to clamp said strip, and a press having means to cut and form a contact element from said strip, said press also having means to control the opening and closing of the first clamp, the opening and closing of the second clamp, the reciprocation of the second clamp to feed the strip through the welder; and drive means to control the operation of the switch means, the reciprocation of the movable welder electrode, and the operation of the wire cutter as well as the operation of the press.

2. In combination, a reciprocatable welder electrode having a passageway longitudinally thereof for feeding a wire therethrough, a wire cutter at the wire exit end of the passageway, a cooperating fixed electrode across which a metal strip is intermittently fed, a welding transformer connected to the electrodes and switch means to control the transformer, a first clamp, a second longitudinally reciprocatable clamp operating in time overlapping alternation with said first clamp to clamp said strip, a peener between the electrodes and the first clamp, and a press having means to cut and form a contact element from said strip, said press also having means to control the opening and closing of the first clamp, the opening and closing of the second clamp, the reciprocation of the second clamp to feed the strip through the welder; and drive means to control the operation of the switch means, the reciprocation of the movable welder electrode, the operation of the wire cutter, and the operation of the peener as well as of the press.

3. In combination, a reciprocatable welder electrode having a passageway longitudinally thereof for feeding a wire therethrough, a wire cutter at the wire exit end of the passageway, a cooperating fixed electrode across which a metal strip is intermittently fed, a welding transformer connected to the electrodes and switch means to control the transformer, a first clamp, a second longitudinally reciprocatable clamp operating in time overlapping alternation with said first clamp to clamp said strip, and a press having means to cut and form a contact element from said strip, said press also having means to control the opening and closing of the first clamp, the opening and closing of the second clamp, the reciprocation of the second clamp to feed the strip through the welder; and drive means to control the operation of the switch means to effect a welding of the wire to the strip, the reciprocation of the movable welder electrode, the operation of the wire cutter, the operation of the switch means and the operation of the press to cut and form the contact element being asynchronous.

4. In combination, a vertically reciprocatable welder electrode having a vertical passageway longitudinally thereof for feeding a wire therethrough, a wire cutter at the lower end of the passageway, a cooperating fixed electrode across which a metal strip is intermittently fed, a plate above the fixed electrode provided with a perforation through which the wire is fed into contact with the strip, said wire cutter having blades positionable immediately above the plate during wire cutting operation, a welding transformer connected to the electrodes and switch means to control the transformer, a first clamp, a second longitudinally reciprocatable clamp operating in time overlapping alternation with said first clamp to clamp said strip, and a press having means to cut and form a contact element from said strip, said press also having means to control the opening and closing of the first clamp, the opening and closing of the second clamp, the reciprocation of the second clamp to feed the strip through the welder; and drive means to control the operation of the switch means, the reciprocation of the movable welder electrode, and the operation of the wire cutter as well as of the press.

5. In combination, a vertically reciprocatable welder electrode having a vertical passageway longitudinally thereof for feeding a wire therethrough, a wire cutter at the lower end of the passageway, a cooperating fixed electrode across which a metal strip is intermittently fed, a plate above the fixed electrode provided with a perforation through which the wire is fed into contact with the strip, said wire cutter having blades positionable immediately above the plate during wire cutting operation, a welding transformer connected to the electrodes and switch means to control the transformer, a first clamp, a second longitudinally reciprocatable clamp operating in time overlapping alternation with said first clamp to clamp said strip, and a press having means to cut and form a contact element from said strip, said press also having means to control the opening and closing of the first clamp, the opening and closing of the second clamp, the reciprocation of the second clamp to feed the strip through the welder; and drive means to control the operation of the switch means, the reciprocation of the movable welder electrode, and the operation of the wire cutter, said drive means including a cam operatively connected with the reciprocatable electrode to first move the wire downwardly into contact with the strip and, subsequent to welding, pull up on the wire to bring the strip into contact with the underside of the perforated plate, and, subsequent to wire cutting, further move the reciprocatable electrode to ensure complete separation of the wire from the portion of the wire below the plate.

6. In combination, a reciprocatable welder electrode having a passageway longitudinally thereof for feeding a wire therethrough, a wire cutter at the wire exit end of the passageway, a cooperating fixed electrode across which a metal strip is intermittently fed, a welding transformer connected to the electrodes and switch means to control the transformer, said welding electrodes and cutter causing the application of a contact on said strip, the contact material being furnished by said wire, a first clamp, a second longitudinally reciprocatable clamp operating in time overlapping alternation with said first clamp to clamp said strip, and a press having a contact sensing means, means to cut and form a contact element from said strip; said press also having means to control the opening and closing of the first clamp, the opening and closing of the second clamp, the reciprocation of the second clamp to feed the strip through the welder; drive means to control the operation of the switch means, the reciprocation of the movable welder electrode and the operation of the wire cutter; and means under control of the sensing means to stop the press and associated mechanism upon undue movement thereof due to the absence of a contact on the strip.

7. In combination, a reciprocatable welder electrode having a passageway longitudinally thereof for feeding a wire therethrough, a wire cutter at the wire exit end of the passageway, a cooperating fixed electrode bridged by a perforated plate to provide a space therebetween through which a metal strip is intermittently fed, with the perforation in the plate providing a passageway for the end of the wire to contact the strip, a welding transformer connected to the electrodes and switch means to control the transformer, a first clamp, a second longitudinally reciprocatable clamp operating in time overlapping alternation with said first clamp to clamp said strip, and a press having means to cut and form a contact element from said strip, said press also having means to control the opening and closing of the first clamp, the opening and closing of the second clamp, the reciprocation of the second clamp to fed the strip through the welder; and drive means to control the operation of the switch means, the reciprocation of the movable welder electrode and the operation of the wire cutter as well as of the press.

8. In combination, a reciprocatable welder electrode having a passageway longitudinally thereof for feeding a wire therethrough, a wire cutter at the wire exit end of the passageway, a cooperating fixed electrode bridged by a perforated plate to provide a space therebetween through which a metal strip is intermittently fed, with the perforation in the plate providing a passageway for the end of the wire to contact the strip, a welding transformer connected to the electrodes and switch means to control the transformer, a first clamp, a second longitudinally reciprocatable clamp operating in time overlapping alternation with said first clamp to clamp said strip, and a press having a contact sensing means, means to cut and form a contact element from said strip, said press also having means to control the opening and closing of the first clamp, the opening and closing of the second clamp, the reciprocation of the second clamp to feed the strip through the welder; and drive means to control the operation of the switch means, the reciprocation of the movable welder electrode and the operation of the wire cutter; and means under control of the sensing means to stop the press and associated mechanism upon undue movement thereof due to the absence of a contact on the strip.

9. In combination, a reciprocatable welder electrode having a passageway longitudinally thereof for feeding a wire therethrough, a wire cutter at the exit end of the passageway, a cooperating electrode across which a metal strip is intermittently fed, said cooperating electrode including a plate adjustable at will transverse to the direction of feed of the metal strip, a welding transformer connected to the electrodes and switch means to control the transformer, a first clamp beyond the electrodes in the direction of feed of the strip, a second longitudinally reciprocatable clamp beyond the first clamp and operating in time overlapping relationship with said first clamp to clamp said strip, and a press having means to cut and form a contact element from said strip, said press also having means to control the opening and closing of the first clamp, the opening and closing of the second clamp, and the reciprocation of the second clamp to feed the strip through the welder; and drive means to control the operation of the switch means, the reciprocation of the movable welder electrode, the operation of the movable welder electrode and the operation of the press.

10. In combination, a reciprocatable welder electrode having a passageway longitudinally thereof for feeding a wire therethrough, a wire cutter at the exit end of the passageway, a cooperating electrode across which a metal strip is intermittently fed, said cooperating electrode including a beveled plate adjustable at will transverse to the direction of feed of the metal strip, a welding transformer connected to the electrodes and switch means to control the transformer, a first clamp beyond the electrodes in the direction of feed of the strip, a second longitudinally reciprocatable clamp beyond the first clamp and operating in time overlapping relationship with said first clamp to clamp said strip, and a press having means to cut and form a contact element from said strip, said press also having means to control the opening and closing of the first clamp, the opening and closing of the second clamp, and the reciprocation of the second clamp to feed the strip through the welder; and drive means to control the operation of the switch means, the reciprocation of the movable welder electrode, the operation of the movable welder electrode and the operation of the press.

11. In combination, a reciprocatable welder electrode having a passageway longitudinally thereof for feeding a wire therethrough, a wire cutter at the exit end of the passageway, a cooperating electrode across which a metal strip is intermittently fed, a welding transformer connected to the electrodes and switch means to control the transformer, a first clamp beyond the electrodes in the direction of feed of the strip, a second longitudinally reciprocatable clamp beyond the first clamp and operating in time overlapping relationship with said first clamp to clamp said strip, and a press having means to cut and form a contact element from said strip, said press also having means to control the opening and closing of the first clamp, the opening and closing of the second clamp, and the reciprocation of the second clamp to feed the strip through the welder; and drive means to control the operation of the switch means, the reciprocation of the movable welder electrode, the operation of the movable welder electrode and the operation of the press, the second clamp being movable between the jaws of the press and having a cam follower pin extending laterally from the clamp, a movable jaw of the press having a cam plate with a cam slot therein in which said cam follower pin is engaged.

12. In combination, a reciprocatable welder electrode having a passageway longitudinally thereof for feeding a wire therethrough, a wire cutter at the exit end of the passageway, a cooperating electrode across which a metal strip is intermittently fed, a welding transformer connected to the electrodes and switch means to control the transformer, a first clamp beyond the electrodes in the direction of feed of the strip, a second longitudinally reciprocatable clamp beyond the first clamp and operating in time overlapping relationship with said first clamp to clamp said strip, and a press having means to cut and form a contact element from said strip, said press also having means to control the opening and closing of the first clamp, the opening and closing of the second clamp, and the reciprocation of the second clamp to feed the strip through the welder; and drive means to control the operation of the switch means, the reciprocation of the movable welder electrode, the operation of the movable welder electrode and the operation of the press, the second clamp being movable between the jaws and having a jaw operating lever; a block on a movable jaw of the press in position to engage the lever to enable the opening of the second clamp on lowering of the movable press jaw and a finger on the movable press jaw to engage the lever to close the second clamp on lift on the movable press jaw.

13. In the manufacture of electrical contacts, the step of intermittently feeding a metal strip between a pair of welding electrodes provided with a fixed lower electrode and a movable upper electrode with a perforated plate therebetween, and feeding the strip between strip cutting and contact forming dies, feeding a contact wire through the perforation in the plate onto the strip and welding the wire thereto, pulling the attached strip against one side of the plate, cutting the wire on the other side of the plate at the top level of the plate while the strip is so held against the plate, and cutting the strip and forming the cut-off strip, said last step being asynchronous with the welding operation.

14. An apparatus for manufacturing electrical connectors having a formed strip with an attached contact located at a given contoured portion thereof comprising supply means for continuous connector strip material, intermittently operable strip feeding means for moving the strip a prescribed distance during each operation, contact wire welding and cutting means operable to attach the contacts to the strip at locations spaced from one another by said prescribed distance, contact shaping means spaced from said welding means for shaping the cut wire contact, means for forming said connector strip and for removing the connector from the strip, said forming means having a die operable upon the strip to provide said contoured portion located substantially at a multiple of said prescribed distance along the strip from the welding means, and means for operating the welding, shaping, and forming means between said intermittent strip movements with the welding means operating upon said strip asynchronously with said shaping and forming means.

References Cited in the file of this patent

UNITED STATES PATENTS

| | | |
|---|---|---|
| 2,316,597 | Kershaw | Apr. 13, 1943 |
| 2,339,884 | Schlumpf | Jan. 25, 1944 |
| 2,711,466 | Marx | June 21, 1955 |
| 2,734,119 | Pityo | Feb. 7, 1956 |